United States Patent [19]

Summers et al.

[11] Patent Number: 5,026,823

[45] Date of Patent: Jun. 25, 1991

[54] ALICYCLIC POLYIMIDES AND A PROCESS FOR MAKING THE SAME

[75] Inventors: John D. Summers, Walnut Creek; Thomas O. Jeanes, Antioch, both of Calif.

[73] Assignee: The Dow Chemical Company, Midland, Mich.

[21] Appl. No.: 406,677

[22] Filed: Sep. 12, 1989

[51] Int. Cl.$^5$ .................... C08G 69/26; C08G 69/42; C08G 63/00

[52] U.S. Cl. .................... 528/353; 528/344; 528/345; 528/346; 528/337; 528/183

[58] Field of Search .............. 528/344, 345, 353, 346, 528/337, 183

[56] References Cited

U.S. PATENT DOCUMENTS

| | | | |
|---|---|---|---|
| 3,179,614 | 4/1965 | Edwards . | |
| 3,179,630 | 4/1965 | Enduy | 528/183 |
| 3,179,632 | 4/1965 | Hendrix | 528/183 |
| 3,822,202 | 7/1974 | Hoehn | 210/23 |
| 3,925,211 | 12/1975 | Schumann et al. | 264/41 |
| 4,240,914 | 12/1980 | Iwama et al. | 428/304 |
| 4,358,378 | 11/1982 | Iwama et al. | 427/244 |
| 4,378,400 | 3/1983 | Makino et al. | 55/158 |
| 4,454,310 | 6/1984 | Oka et al. | 528/352 |
| 4,532,041 | 7/1985 | Shuey et al. | 210/500.2 |
| 4,639,485 | 1/1987 | Frayer | 524/104 |
| 4,690,873 | 9/1987 | Makino et al. | 55/158 |
| 4,705,540 | 11/1987 | Hayes | 55/158 |
| 4,717,393 | 1/1988 | Hayes | 55/158 |
| 4,717,394 | 1/1988 | Hayes | 55/158 |
| 4,847,311 | 7/1989 | Yamaya et al. | 525/432 |
| 4,851,505 | 7/1989 | Hayes | 528/353 |
| 4,851,506 | 7/1989 | Rohde et al. | 528/353 |
| 4,857,079 | 8/1989 | Kimura et al. | 528/353 |
| 4,880,699 | 11/1989 | Kohn | 528/188 |

FOREIGN PATENT DOCUMENTS

| | | |
|---|---|---|
| 113574 | 7/1984 | European Pat. Off. . |
| 160140 | 11/1985 | European Pat. Off. . |
| 241937 | 10/1987 | European Pat. Off. . |
| 264229 | 4/1988 | European Pat. Off. . |
| 57-170936 | 10/1982 | Japan . |
| 58-05344 | 1/1983 | Japan . |
| 60-125209 | 7/1985 | Japan . |
| 60-150806 | 8/1985 | Japan . |
| 60-257805 | 9/1985 | Japan . |
| 63-019212 | 12/1985 | Japan . |
| 59098704 | 12/1985 | Japan . |
| 62061602 | 12/1985 | Japan . |
| 61-103521 | 5/1986 | Japan . |
| 61-133106 | 6/1986 | Japan . |
| 62-038207 | 2/1987 | Japan . |
| 62-074410 | 4/1987 | Japan . |
| 62-074434 | 4/1987 | Japan . |
| 62-114611 | 5/1987 | Japan . |
| 62-163712 | 7/1987 | Japan . |
| 62-216622 | 9/1987 | Japan . |
| 62-231017 | 10/1987 | Japan . |
| 63-028424 | 2/1988 | Japan . |

OTHER PUBLICATIONS

Johnson et al., "Synthesis of Polyimide-Poly(arylene ether sulfone) Copolymers", *Polymer Preprints*, vol. 25(2), 1989, pp. 49-51.

Summers et al., "Kinetic Studies of Homo- and Copolymer Solution Imidizations," *Polymer Preprints*, vol. 28(2), 1987, pp. 230-231.

Durvasula et al., "Synthesis of Polyphenylene Ether and Thioether Ketones," *Journal of Polymer Science: Part A: Polymer Chemistry*, vol. 27, 1989, pp. 661-669.

Takekoshi et al., "Polyetherimides. II. High Temperature Solution Polymerization," *Journal of Polymer Science: Polymer Symposium*, vol. 74, 1986, pp. 93-108.

Koros et al., "Relationship Between Gas Separation Properties and Chemical Structure in a Series of Aromatic Polyimides, "*Journal of Membrane Science*, vol. 37, 1988, pp. 45-62.

O'Brien et al., "Influence of Casting and Curing Conditions on Gas Sorption and Transport in Polyimide Films," *Polymer Engineering and Science*, vol. 27, No. 3, Feb. 1987, pp. 211-217.

Kim et al., "Advanced Gas Separation Membrane Materials: Rigid Aromatic Polyimides," *Fifth Symposium on Separation Science and Technology for Energy Applications*, Oct. 26-29, 1987.

"Polyimides, "*Encyclopedia of Polymer Science and Engineering*, vol. 12, John Wiley & Sons, New York, New York, 1988, pp. 364-383.

"Polyimides," *Kirk-Othmer Encyclopedia of Chemical Technology*, 3rd edition, vol. 18, John Wiley & Sons, New York, New York, 1982, pp. 704-719.

Primary Examiner—Morton Foelak
Assistant Examiner—Kathryne E. Shelborne
Attorney, Agent, or Firm—Janet Pauline Clark

[57] ABSTRACT

This invention relates to novel polyimides derived from alicyclic dianhydrides and a process for synthesizing the polyimides.

20 Claims, No Drawings

ALICYCLIC POLYIMIDES AND A PROCESS FOR MAKING THE SAME

BACKGROUND OF THE INVENTION

This invention relates to novel polyimides derived from alicyclic dianhydrides. This invention further relates to a process for synthesizing said polyimides.

Polyimides are generally considered to be high performance materials because of their excellent mechanical properties and thermal and oxidative stability. Polyimides are extensively used in place of metals and glass in many applications throughout industry, particularly in automotive, aerospace, electronic, and packaging applications. Polyimides possess utility in a wide variety of applications as films, fibers, molded articles, foams, adhesives, coatings, and the like.

Polyimides are generally synthesized in a two step process in which a dianhydride is reacted in a dipolar aprotic solvent with a diamine to form the corresponding polyamic acid, which is then thermally or chemically cyclized to the polyimide. Commonly used dipolar aprotic solvents include dimethylformamide, dimethylacetamide, dimethylsulfoxide, and N-methyl-2-pyrrolidinone. The first step of the reaction to form the polyamic acid is generally carried out at temperatures below about 60° C., in order to prevent premature cyclization and thereby maintain solubility, since known aromatic polyimides are often insoluble in common organic solvents. In such cases, the desired article is formed from the soluble polyamic acid and the article is then thermally or chemically imidized. Thermal imidization is usually carried out between about 150° and 300° C. Alternatively, cyclization can be effected by use of a chemical dehydrating agent such as acetic anhydride in pyridine.

The problem associated with many of the known aromatic polyimides is that such polyimides are often insoluble in common organic solvents and thus require a two step fabrication process in which the polyamic acid is formed into the final article which is then converted to the polyimide. What is needed are polyimides which are soluble in common organic solvents and therefore are directly processable into articles in a single fabrication step. Such polyimides should also possess good thermal and mechanical properties.

SUMMARY OF THE INVENTION

The invention is a novel polyimide comprising recurring units corresponding to the formula:

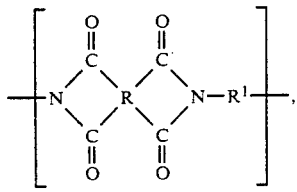

wherein $R^1$ is the divalent residue of at least one aliphatic, alicyclic, or aromatic diamine and R is the tetravalent residue of at least one unsubstituted or inertly substituted alicyclic dianhydride, said dianhydride selected from the group consisting of:

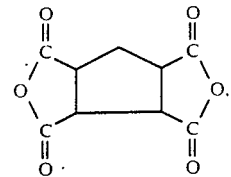

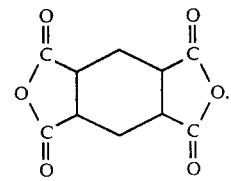

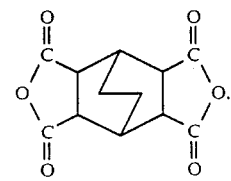

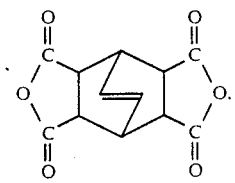

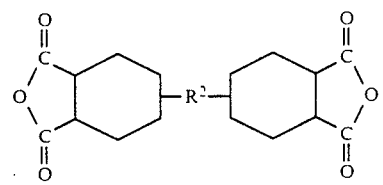

wherein $R^2$ is:

—, —O—, —CO—, —S—, —SO$_2$—,

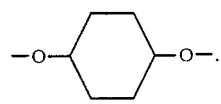

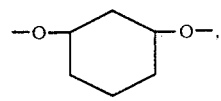

a $C_{1-6}$ divalent hydrocarbon radical, or a $C_{1-6}$ halo-substituted hydrocarbon radical, and

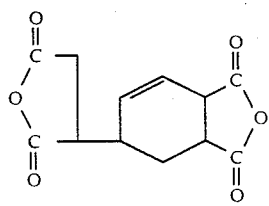

The inertly substituted groups on the dianhydride comprise $C_{1-4}$ alkyl.

In another aspect, the invention is a process for synthesizing a polyimide comprising:

A. reacting in solution at least one unsubstituted or inertly substituted alicyclic dianhydride and at least one diamine, wherein the solution comprises at least one dipolar aprotic solvent and a dehydrating agent, under conditions such that the dianhydride(s) and diamine(s) polymerize to form a polyimide:

B. precipitating the polyimide from the solution; and

C. drying the polyimide; wherein the dianhydride(s) is selected from the group consisting of:

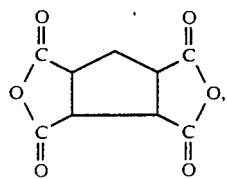

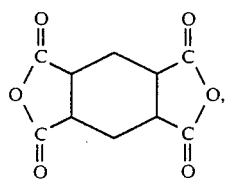

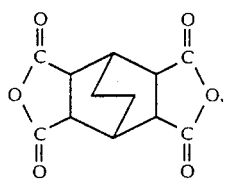

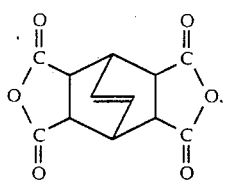

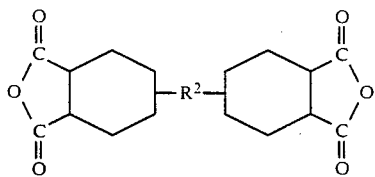

wherein $R^2$ is:
—, —O—, —CO—, —S—, —SO$_2$—,

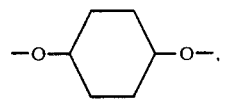

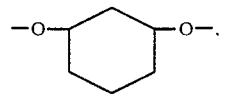

a C$_{1-6}$ divalent hydrocarbon radical, or a C$_{1-6}$ halo-substituted hydrocarbon radical, and

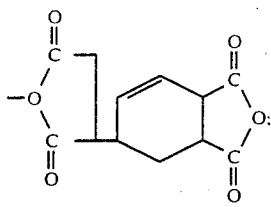

wherein the inertly substituted groups on the dianhydride comprise C$_{1-4}$ alkyl, and the diamine(s) is aliphatic, alicyclic, or aromatic.

The polyimides of this invention are soluble in common organic solvents and are therefore easily processed. These polyimides possess good mechanical properties and thermal and oxidative stability. These polyimides are useful for films, fibers, foams, molded articles, coatings, adhesives, and the like. In particular, the polyimides of this invention possess utility as gas separation membranes.

DETAILED DESCRIPTION OF THE INVENTION

The polyimides of this invention are derived from alicyclic dianhydrides and aliphatic, alicyclic, or aromatic diamines. The polyimides of this invention correspond to repeat units of Formula I:

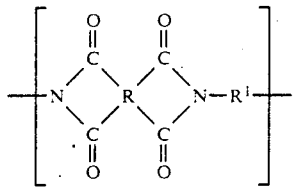

wherein R is the tetravalent residue of at least one unsubstituted or inertly substituted alicyclic dianhydride, the dianhydride selected from the group consisting of:

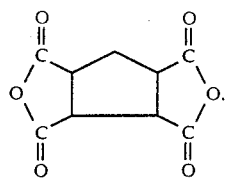

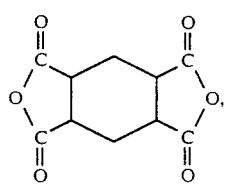

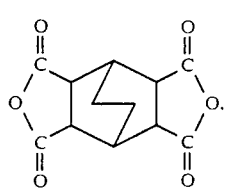

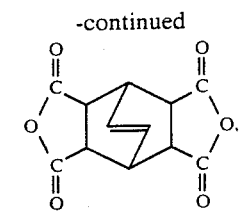

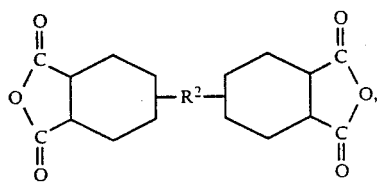

wherein R² is:
—, —O—, —CO—, —S—, —SO₂—,

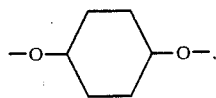

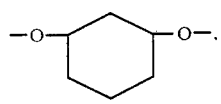

a $C_{1-6}$ divalent hydrocarbon radical, or a $C_{1-6}$ halo-substituted hydrocarbon radical, and

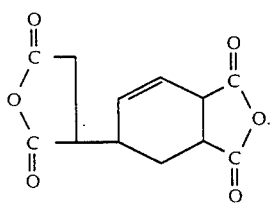

R¹ is the divalent residue of at least one aliphatic, alicyclic, or aromatic diamine. The inertly substituted groups comprise $C_{1-4}$ alkyl.

R is preferably the tetravalent residue of at least one alicyclic dianhydride selected from the group consisting of:

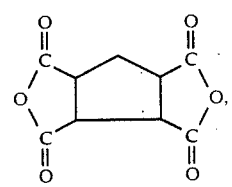

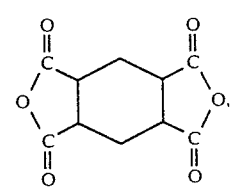

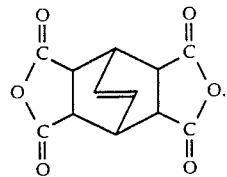

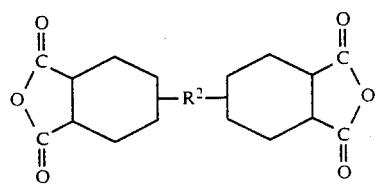

wherein R² is: —, —O—, —CO—, —S—, —SO₂—,

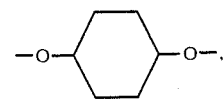

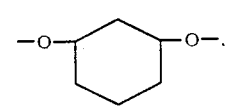

a $C_{1-6}$ divalent hydrocarbon radical, or a $C_{1-6}$ halo-substituted hydrocarbon radical, and

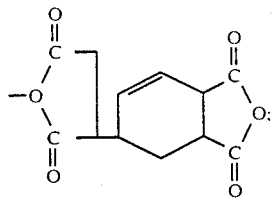

wherein the inertly substituted groups comprise $C_{1-4}$ alkyl.

R is more preferably the tetravalent residue of at least one alicyclic dianhydride selected from the group consisting of:

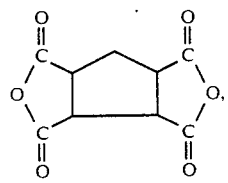

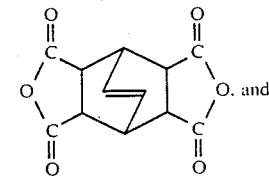

-continued

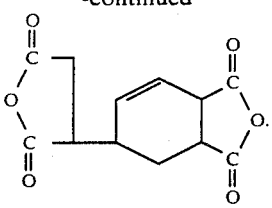

$R^1$ is preferably the divalent residue of at least one alicyclic or aromatic diamine, more preferably at least one aromatic diamine. Preferred divalent aromatic residues for $R^1$ include divalent residues of aromatic diamines selected from the group consisting of:

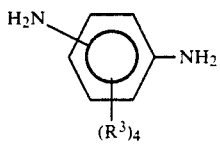

wherein $R^3$ is independently in each occurrence hydrogen, a $C_{1-4}$ alkyl, or a halogen,

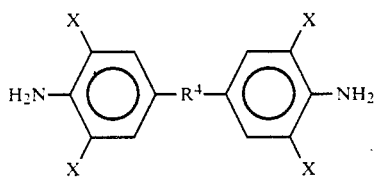

wherein $R^4$ is:
—, —O—, —CO—, —SO$_2$—, —S—,

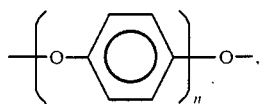

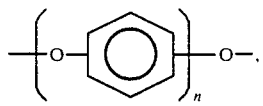

a $C_{1-6}$ divalent hydrocarbon radical, or a $C_{1-6}$ halo-substituted hydrocarbon radical, X is independently in each occurence hydrogen, a $C_{1-4}$ alkyl, or a halogen, and n is 1, 2, or 3, and

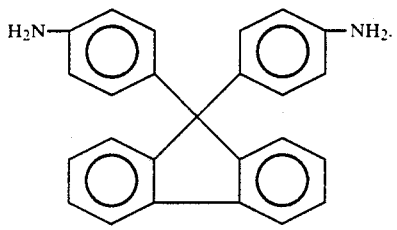

The dianhydrides and diamines useful in preparing the polyimides of this invention are commercially available or prepared by conventional synthesis techniques. The alicyclic dianhydrides useful in this invention may readily be prepared by conventional techniques, such as via hydrogenation of the corresponding aromatic dianhydride or conversion from the tetracarboxylic acid analog. For example, the alicyclic dianhydride may be prepared by hydrogenating the aromatic dianhydride analog in the presence of a rhodium catalyst in an organic phase containing a phase transfer catalyst such as a quaternary ammonium salt and a buffer solution. See Krzystof et al., "Exceedingly Mild, Selective and Stereospecific Phase-Transfer-Catalyzed Hydrogenation of Arenes," *Organometallics*, 1983, pp. 1055–1057, the relevant portions incorporated herein by reference, which describe a similar hydrogenation process for arenes. The alicyclic dianhydrides may be prepared from the tetracarboxylic acid analog by dehydrating the tetracarboxylic acid at elevated temperatures in the presence of acetic anhydride. For discussions of preparation methods for tetracarboxylic acids and conversion to dianhydrides see, for example, U.S. Pat. Nos. 3,242,206 and 3,444,237, French patent reference 1,555,625 (Chemical Abstract No. 72:78529K) and Russian patent reference 433,128 (Chemical Abstract No. 81:910426): the relevant portions incorporated herein by reference. For conventional synthesis methods for diamines useful in this invention, see "Amines," *Encyclopedia of Chemical Technology*. 3rd edition, Vol. 2, John Wiley & Sons, New York, N.Y., 1978, pp. 295–308, 321–338, the relevant portions incorporated herein by reference. See also "Diamines," *Encyclopedia of Chemical Technology*, 3rd edition, Vol. 7, John Wiley & Sons, New York, N.Y., 1979, pp. 580–602, the relevant portions incorporated herein by reference.

The polyimides of this invention may be formed by a solution polymerization process in which an appropriate amount of the alicyclic dianhydride(s) is reacted with an appropriate amount of the diamine(s) in a solution comprising a dipolar aprotic solvent and a dehydrating agent under conditions such that the dianhydride(s) and diamine(s) polymerize to form a polyimide possessing a weight-average molecular weight (Mw) of preferably between about 30,000 to about 500,000. The mole ratio of dianhydride(s) to diamine(s) used is preferably between about 0.95 and about 1.05, more preferably between about 0.99 and about 1.01. The concentration of dianhydride(s) and diamine(s) in the solution is preferably between about 10 and about 30 weight percent.

Preferred dipolar aprotic solvents for use in the inventive process include dimethylacetamide, dimethylformamide, dimethylsulfoxide, sulfolane, N-methyl-2-pyrrolidinone, hexamethylphosphoramide, and N-cyclohexyl-2-pyrrolidinone, more preferably dimethylacetamide and N-methyl-2-pyrrolidinone. Preferred dehydrating agents for use in the inventive process include N-cyclohexyl-2-pyrrolidinone. The same compound may be capable of serving as both the solvent and the dehydrating agent. The mole ratio of dipolar aprotic solvent to dehydrating agent in the solution is preferably between about 0:100 and about 90:10, more preferably between about 70:30 and about 90:10.

The solution is heated preferably under an inert atmosphere to a temperature at which the polymerization reaction occurs at a reasonable rate, preferably between about 120° and about 265° C., more preferably between about 175° and 195° C., for a time sufficient to polymerize the reactants to a useful extent, preferably between about 2 hours and 4 days, more preferably between about 8 hours and about 3 days.

The weight of polyimide in solution after polymerization has been carried out is preferably between about 5 and about 30 weight percent, more preferably between about 10 and about 25 weight percent. The polymer is precipitated from the solution with a non-solvent and dried. Preferred precipitating agents include lower alcohols and water. The polyimides may be further purified by redissolving the polyimide in a solvent and reprecipitating the polyimide. The polyimides are preferably dried at a temperature between about 25° and about 300° C., more preferably between about 50° and about 200° C.

The polyimides so formed possess a weight-average molecular weight (Mw) such that the polyimides are useful for forming fibers, films, molded articles, foams, adhesives, coatings, and the like. The weight-average molecular weight of such polyimides is preferably at least about 30,000, more preferably of at least about 50,000; the weight-average molecular weight of such polyimides is preferably less than about 500,000, more preferably less than about 300,000. The intrinsic viscosity of such polyimides is preferably between about 0.45 and about 1.9 deciliters/gram, more preferably between about 0.5 and about 1.7 deciliters/gram as measured in a dipolar aprotic solvent such as N-methyl-2-pyrrolidinone or dimethylacetamide. The polyimides of this invention are preferably soluble in common dipolar aprotic solvents such as dimethylacetamide, N-methyl-2-pyrrolidinone, dimethylformamide, dimethylsulfoxide, sulfolane, hexamethylphosphoramide, N-cyclohexyl-2-pyrrolidinone, chlorinated hydrocarbons, and ethers.

The polyimides of this invention preferably possess glass transition temperatures of at least about 250° C., more preferably of at least about 300° C. The polyimides preferably possess a tensile strength as measured by ASTM D-882 of at least about 10,000 psi, more preferably of at least about 12,000 psi. The polyimides preferably possess a break elongation as measured by ASTM D-882 of at least about 7 percent, more preferably of at least about 10 percent. The polyimides preferably possess a tensile modulus of at least about 350,000 psi, more preferably of at least about 400,000 psi as measured by ASTM D-882. The polyimides preferably absorb less than about 5 weight percent water, more preferably less than about 3 weight percent water. The polyimides preferably exhibit a weight loss of less than about 10 percent, more preferably of less than about 5 percent at about 500° C. as measured by thermogravimetric analysis.

The polyimides of this invention are useful in forming fibers, films, molded articles, foams, adhesives, coatings, and the like. In particular, the polyimides of this invention possess utility as gas separation membranes.

SPECIFIC EMBODIMENTS

The following Examples are included for illustrative purposes only and are not intended to limit the scope of the invention or claims.

Example 1

A polyimide is prepared using about 3.0 grams cyclopentane dianhydride, 2.86 grams oxydianiline, 15 milliliters N-methyl-2-pyrrolidinone, and 5 milliliters N-cyclohexyl-2-pyrrolidinone. A 250 milliliter three neck round bottom flask is equipped with a nitrogen inlet, overhead stirrer, Dean Stark trap, condenser, drying tube, thermometer, and silicone heating bath. The bath is preheated to about 180° C. The dianhydride and dianiline are added to the flask and washed with the pyrrolidinone solvents. The solution is heated to about 175°–195° C. for about 48 hours. The resulting viscous dark brown solution is cooled, diluted to about 10 weight percent solids with dimethylformamide, filtered, and added dropwise to rapidly stirred methanol to precipitate the polymer. The fluffy white powder thus obtained is then filtered, washed with methanol, and dried in a vacuum oven.

Example 2

A polyimide is prepared by reacting bicyclo-[2,2,2]-7-octene-2,3,5,6-tetracarboxylic dianhydride, about 3.1000 g, 4,4'-oxydianiline, about 2.5010 g, N-methyl-2-pyrrolidinone, about 30 ml, and N-cyclohexyl-2-pyrrolidinone, about 6 ml, in a 250 ml round bottom flask equipped as in Example 1. The reactants are added to the reaction flask and the solution heated to about 185° C. During the later stages of the reaction, the polymer tends to precipitate. However, cooling the viscous solution to about 150° C. allows the polymer to redissolve, indicating the presence of a critical solution temperature. After about 24 hours reaction time, the polymer is isolated via precipitation in a stirred methanol solution. A creasable film is formed by dissolving the polyimide in dimethylacetamide, casting the solution onto a glass plate, and evaporating the solvent under vacuum conditions. The film is then removed from the glass plate and heat treated under vacuum at about 300° C. for about 2 hours.

Example 3

A polyimide is prepared by reacting Epiclon ® B-4400, 5-(2,5-dioxotetrahydro-3-foranyl)-3-cyclohexene-1,2-dicarboxylic anhydride (TM trademark of Dainippon Ink & Chemicals, Inc., available through Chrishev Company, Leawood, Kans.), about 3.0000 g, 4,4'-oxydianiline, about 2.2735 g, N-methyl-2-pyrrolidinone, about 15 ml, and N-cyclohexyl-2-pyrrolidinone, about 5.0 ml. Procedures for preparing, isolating, and processing the polyimide are similar to that described in Example 1.

Example 4

A polyimide is prepared by reacting 9,9'-bis-4-aminophenylfluorene, about 2.1000 g, bicyclo-[2,2,2]-7-octene-2,3,5,6,-tetracarboxylic dianhydride, about 1.4958 g, N-methyl-2-pyrrolidinone, about 20 ml, and N-cyclohexyl-2-pyrrolidinone, about 4.5 ml. Procedures for preparing, isolating, and processing the polyimide are similar to that described in Example 1, except that because this polymer is reacted at lower solids content, about 12.5 weight percent, the reaction solution is not diluted further prior to polymer isolation.

The properties of the polyimides of Examples 1–4 are evaluated by conventional polymer characterization techniques and the results reported in Table I. The molecular weight of the polyimides in dimethylacetamide with 0.1 weight percent lithium bromide is measured by gel permeation chromatography (GPC) using polystyrene standards. Glass transition temperatures are measured by differential scanning calorimetry (DSC) using a duPont 1090 Thermal Analyzer scanning at a rate of about 10° C./minute. Values for tensile modulus, tensile strength, and elongation at break are determined in accordance with ASTM D-882.

TABLE I

| | | | Properties of Alicyclic Polyimides | | | |
|---|---|---|---|---|---|---|
| Example | Mw | Mw/Mn | Tg (°C.) | Tensile Modulus (psi) | Tensile Strength (psi) | Elongation at Break (Percent) |
| 1 | 452,600 | 12.1 | 320 | 500,400 | 13,500 | 7.4 |
| 2 | 52,200 | 2.7 | | 419,300 | 11,400 | 13.2 |
| 3 | 110,000 | 3.1 | | 405,800 | 12,900 | 11.2 |
| 4 | 73,600 | 3.0 | >400 | 420,200 | 10,800 | 5.0 |

What is claimed is:

1. An alicyclic polyimide having recurring units corresponding to the formula:

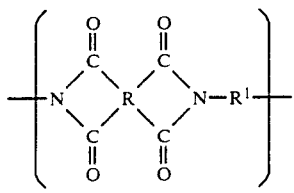

wherein R is the tetravalent residue of at least one unsubstituted or inertly substituted alicyclic dianhydride, said dianhydride selected from the group consisting of:

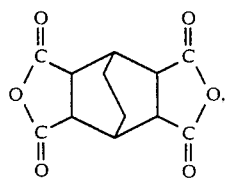

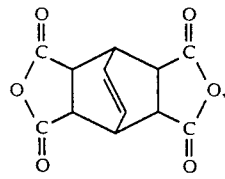

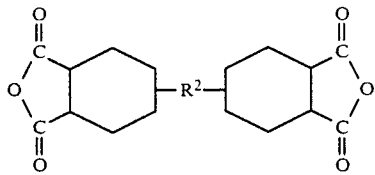

wherein $R^2$ is:
—, —O—, —CO—, —S—, —SO$_2$—,

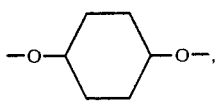

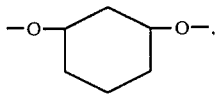

a C$_{1-6}$ divalent hydrocarbon radical, or a C$_{1-6}$ halo-substituted hydrocarbon radical, and

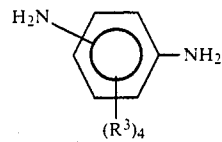

wherein the groups inertly substituted on the dianhydride comprise C$_{1-4}$ alkyl, and $R^1$ is the divalent residue of at least one aliphatic, alicyclic, or aromatic diamine; and wherein said polyimide is soluble in dipolar aprotic solvents.

2. The polyimide of claim 1 wherein the polyimide is derived from at least one alicyclic dianhydride and at least one alicyclic or aromatic diamine.

3. The polyimide of claim 2 wherein the polyimide is derived from at least one alicyclic dianhydride and at least one aromatic diamine.

4. The polyimide of claim 3 wherein the polyimide is derived from at least one alicyclic dianhydride and at least one aromatic diamine selected from the group consisting of:

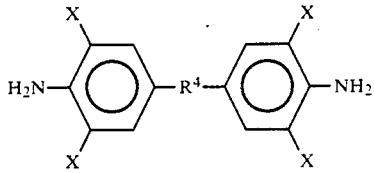

wherein $R^3$ is independently in each occurrence hydrogen, a C$_{1-4}$ alkyl, or a halogen,

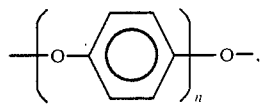

wherein $R^4$ is:
—, —O—, —CO—, —SO$_2$—, —S—,

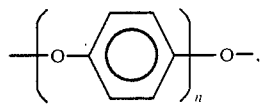

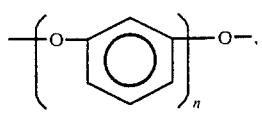

a $C_{1-6}$ divalent hydrocarbon radical, or a $C_{1-6}$ halo-substituted hydrocarbon radical, X is independently in each occurence hydrogen, a $C_{1-4}$ alkyl, or a halogen, and n is 1, 2, or 3, and

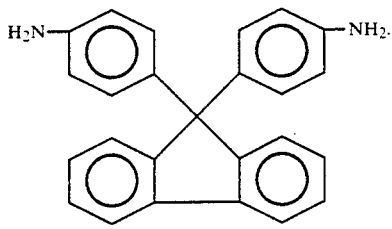

5. The polyimide of claim 4 wherein the polyimide possesses a glass transition temperature of at least about 250° C.

6. The polyimide of claim 4 wherein the polyimide possesses a tensile modulus of at least about 350,000 psi as measured by ASTM D-882.

7. The polyimide of claim 4 wherein the polyimide absorbs less than about 5 weight percent water.

8. The polyimide of claim 4 wherein the polyimide possesses a weight-average molecular weight of between about 30,000 and about 500,000.

9. The polyimide of claim 4 wherein the polyimide exhibits a weight loss of less than about 10 percent at about 500° C. as measured by thermogravimetric analysis.

10. The polyimide of claim 4 wherein the polyimide possesses a tensile strength as measured by ASTM D-882 of at least about 10,000 psi.

11. The polyimide of claim 4 wherein the polyimide possesses a break elongation as measured by ASTM D-882 of at least about 7 percent.

12. A process for synthesizing an alicyclic polyimide comprising:

A. reacting in solution at least one unsubstituted or inertly substituted alicyclic dianhydride and at least one diamine, wherein the solution comprises at least one dipolar aprotic solvent and a dehydrating agent, under conditions such that the dianhydride(s) and diamine(s) polymerize to form a polyimide soluble in dipolar aprotic solvents;

B. precipitating the polyimide from the solution; and

C. drying the polyimide;

wherein the dianhydride(s) is selected from the group consisting of:

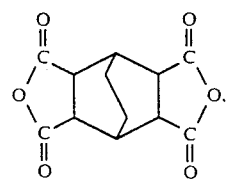

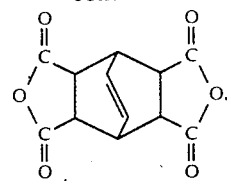

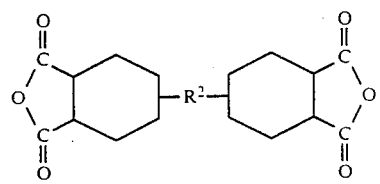

wherein $R^2$ is:
—, —O—, —CO—, —S—, —SO$_2$—,

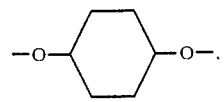

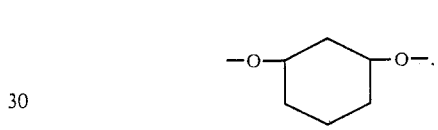

a $C_{1-6}$ divalent hydrocarbon radical, or a $C_{1-6}$ halo-substituted hydrocarbon radical, and

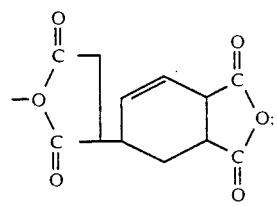

wherein the inertly substituted groups on the dianhydride comprise $C_{1-4}$ alkyl, and the diamine(s) is aliphatic, alicyclic, or aromatic.

13. The process of claim 12 wherein the polyimide is derived from at least one alicyclic dianhydride and at least one alicyclic or aromatic diamine.

14. The process of claim 13 wherein the polyimide is derived from at least one alicyclic dianhydride and at least one aromatic diamine.

15. The process of claim 14 wherein the polyimide is derived from at least one alicyclic dianhydride and at least one aromatic diamine selected from the group consisting of:

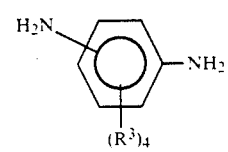

wherein $R^3$ is independently in each occurrence hydrogen, a $C_{1-4}$ alkyl, or a halogen,

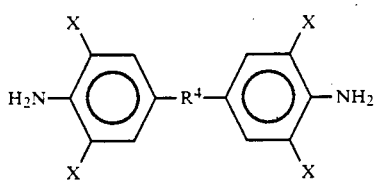

wherein R⁴ is:

—, —O—, —CO—, —SO₂—, —S—,

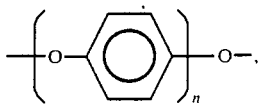

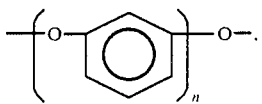

a $C_{1-6}$ divalent hydrocarbon radical, or a $C_{1-6}$ halo-substituted hydrocarbon radical, X is independently in each occurence hydrogen, a $C_{1-4}$ alkyl, or a halogen, and n is 1, 2, or 3, and

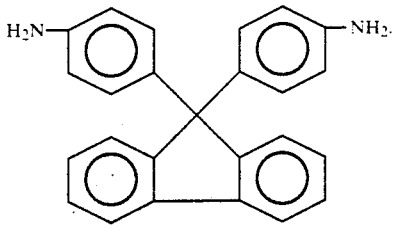

16. The process of claim 15 wherein the mole ratio of dianhydride(s) to diamine(s) is between about 0.95 about 1.05.

17. The process of claim 16 wherein the reaction temperature is between about 120° and about 265° C.

18. The process of claim 17 wherein the dipolar aprotic solvent is selected from the group consisting of dimethylacetamide, dimethylformamide, dimethylsulfoxide, sulfolane, N-methyl-2-pyrrolidinone, hexamethylphosphoramide, and N-cyclohexyl-2-pyrrolidinone.

19. The process of claim 18 wherein the dehydrating agent is N-cyclohexyl-2-pyrrolidinone.

20. The process of claim 19 wherein the precipitating agent is a lower alcohol or water.

* * * * *